United States Patent
Al-Janabi et al.

(10) Patent No.: US 12,529,150 B2
(45) Date of Patent: Jan. 20, 2026

(54) HYDROGEN SULFIDE CONVERSION

(71) Applicant: Saudi Arabian Oil Company, Dhahran (SA)

(72) Inventors: Yahya T. Al-Janabi, Al-Qatif (SA); Ahmad D. Hammad, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 565 days.

(21) Appl. No.: 18/047,781

(22) Filed: Oct. 19, 2022

(65) Prior Publication Data

US 2024/0133048 A1 Apr. 25, 2024
US 2024/0229250 A9 Jul. 11, 2024

(51) Int. Cl.
*C25B 1/02* (2006.01)
*C25B 1/01* (2021.01)
*C25B 9/05* (2021.01)
*C25B 9/23* (2021.01)
*C25B 9/67* (2021.01)

(52) U.S. Cl.
CPC .............. *C25B 1/02* (2013.01); *C25B 1/01* (2021.01); *C25B 9/05* (2021.01); *C25B 9/23* (2021.01); *C25B 9/67* (2021.01)

(58) Field of Classification Search
CPC ........................................................ C25B 1/02
USPC ................................................ 205/617, 637
See application file for complete search history.

(56) References Cited

U.S. PATENT DOCUMENTS

| | | | | |
|---|---|---|---|---|
| 3,409,520 A | * | 11/1968 | Bolmer | C10G 5/00 205/462 |
| 4,859,292 A | * | 8/1989 | Appleby | H01M 8/0656 204/243.1 |
| 5,019,227 A | * | 5/1991 | White | C25B 1/00 205/637 |
| 5,578,189 A | * | 11/1996 | Joshi | B01D 53/326 205/633 |
| 5,908,545 A | * | 6/1999 | Donini | C25B 1/00 423/576.2 |
| 6,241,871 B1 | | 6/2001 | Donini et al. | |
| 9,631,284 B2 | | 4/2017 | Braun et al. | |
| 9,827,517 B2 | | 11/2017 | Vecitis et al. | |
| 2012/0234694 A1 | | 9/2012 | Vecitis et al. | |
| 2014/0272734 A1 | | 9/2014 | Braun et al. | |

(Continued)

OTHER PUBLICATIONS

He et al, Physicochemical properties of phosphoric acid doped polybenzimidazole membranes for fuel cells, Journal of Membrane Science, vol. 277, No. 1-2, Jun. 2006, pp. 38-45 (Year: 2006).*

(Continued)

*Primary Examiner* — Harry D Wilkins, III
(74) *Attorney, Agent, or Firm* — Fish & Richardson P.C.

(57) ABSTRACT

Power is provided to an electrochemical cell. The electrochemical cell includes an anode side and a cathode side. Hydrogen sulfide in a liquid state is flowed to the anode side. Providing power to the electrochemical cell facilitates electrolysis of the hydrogen sulfide to produce sulfur and protons on the anode side. Providing power to the electrochemical cell facilitates reduction of protons to produce hydrogen on the cathode side. A membrane separating the anode side from the cathode side prevents flow of hydrogen sulfide and sulfur from passing through the membrane while allowing hydrogen cations to pass through the membrane. Sulfur is flowed out of the anode side. Hydrogen is flowed out of the cathode side.

8 Claims, 6 Drawing Sheets

(56) References Cited

U.S. PATENT DOCUMENTS

2019/0376189 A1* 12/2019 Tarabukin ............... C25B 13/04
2022/0205113 A1   6/2022 Lupton et al.

OTHER PUBLICATIONS

Reamer et al, Volumetric Behavior of Hydrogen Sulfide, Industrial & Engineering Chemistry, vol. 42, No. 1, Jan. 1950, pp. 140-143 (Year: 1950).*

Stefanakos et al, Hydrogen Production from Hydrogen Sulfide in IGCC Power Plants, OSTI Technical Report, ID: 927111, Jul. 2007, pp. 1-20 (Year: 2007).*

"Hydrogen sulfide," NIST Chemistry WebBook, SRD 69, available on or before Nov. 17, 2004, via Internet Archive: Wayback Machine URL <http://web.archive.org/web/20041117185301/https://webbook.nist.gov/cgi/cbook.cgi?ID=C7783064&Mask=4>, retrieved on Nov. 15, 2022, retrieved from URL <https://webbook.nist.gov/cgi/cbook.cgi?ID=C7783064&Mask=4>, 6 pages.

Gregory et al., "Electrolysis of liquid hydrogen sulfide," Journal of Applied Electrochemistry, 1980, 10, 405-408, 4 pages.

Ipsakis et al., "An electrocatalytic membrane-assisted process for hydrogen production from H2S in Black Sea: Preliminary results," ScienceDirect, International Journal of Hydrogen Energy, 2015, 40:7530-7538, 9 pages.

Karapekmez et al., "Thermodynamic analysis of a novel solar and geothermal based combined energy system for hydrogen production," ScienceDirect, International Journal of Hydrogen Energy, 2020, 45:5608-5628, 21 pages.

Petrov et al., "An assessment of electrolytic hydrogen production from H2S in Black Sea waters," International Journal of Hydrogen Energy, 2011, 36: 8936-8942, 7 pages.

Wang, "Hydrogen production from a chemical cycle of H2S splitting," ScienceDirect, International Journal of Hydrogen Energy, 2007, 32:3907-3914, 8 pages.

PCT International Search Report and Written Opinion in International Appln. No. PCT/US2023/035495, mailed on May 2, 2024, 14 pages.

* cited by examiner

100A

200A

300A

HYDROGEN SULFIDE CONVERSION

TECHNICAL FIELD

This disclosure relates to conversion of hydrogen sulfide, and in particular, conversion of hydrogen sulfide into elemental sulfur.

BACKGROUND

Hydrocarbons extracted from a reservoir can contain various impurities. Hydrocarbons that are contaminated with significant amounts of sulfur compounds, such as hydrogen sulfide, is considered sour, while hydrocarbons that are contaminated with little or negligible amounts of sulfur compounds is considered sweet. Hydrogen sulfide, in particular, is highly poisonous, corrosive, and flammable. Therefore, the presence and handling of hydrogen sulfide is not only an operational concern (with respect to equipment and piping corrosion) but also a safety concern. The hydrocarbon refining processes can include processes that remove such impurities from the raw hydrocarbons, for example, before the hydrocarbons are transformed into various products.

SUMMARY

This disclosure describes technologies relating to conversion of hydrogen sulfide into elemental sulfur. Certain aspects of the subject matter described can be implemented as a method. Power is provided to an electrochemical cell. The electrochemical cell includes an anode side and a cathode side. Hydrogen sulfide in a liquid state is flowed to the anode side. Providing power to the electrochemical cell facilitates electrolysis of the hydrogen sulfide to produce sulfur and protons on the anode side. Providing power to the electrochemical cell facilitates reduction of protons to produce hydrogen on the cathode side. A membrane separating the anode side from the cathode side prevents flow of hydrogen sulfide and sulfur from passing through the membrane while allowing hydrogen cations to pass through the membrane. Sulfur is flowed out of the anode side. Hydrogen is flowed out of the cathode side.

This, and other aspects, can include one or more of the following features. The hydrogen cations produced on the anode side can pass through the membrane to the cathode side. Providing power to the electrochemical cell can facilitate reduction of the hydrogen cations that have passed through the membrane to produce hydrogen on the cathode side. The hydrogen sulfide flowed to the anode side can have a space velocity in a range of from about 1,000 per hour to about 50,000 per hour through the anode side. The membrane separating the anode side from the cathode side can have a thickness in a range of from about 1 micrometer to about 500 micrometers. The membrane separating the anode side from the cathode side can include a polymer proton-exchange membrane. The polymer proton-exchange membrane can be an electrical insulator. The polymer proton-exchange membrane can be configured to conduct protons. The electrochemical cell can be operated at an operating temperature in a range of from about 25 degrees Celsius (° C.) to about 100° C. The power provided to the electrochemical cell can have a voltage in a range of from about 1 volt (V) to about 3 V. After producing the sulfur, the electrochemical cell can be heated to a sulfur melting temperature of about 150° C. to liquefy the sulfur, such that the sulfur can flow out of the anode side. The anode side of the electrochemical cell can be operated liquid full.

Certain aspects of the subject matter described can be implemented as a system. The system includes an electrochemical cell and hydrogen sulfide in a liquid state. The electrochemical cell includes an anode, a cathode, and a membrane. The anode is at least partially disposed in an anode side of the electrochemical cell. The cathode is at least partially disposed in a cathode side of the electrochemical cell. The membrane separates the anode side from the cathode side. The membrane is configured to prevent flow of hydrogen sulfide, sulfur, and electrons from passing through the membrane while allowing cations to pass through the membrane. The hydrogen sulfide (in a liquid state) enters the anode side of the electrochemical cell. The electrochemical cell is configured to, in response to a voltage applied across the anode and the cathode, perform electrolysis on the hydrogen sulfide to produce sulfur and protons on the anode side.

This, and other aspects can include one or more of the following features. The membrane can be configured to allow the protons to pass from the anode side through the membrane to the cathode side. The electrochemical cell can be configured to, in response to the voltage applied across the anode and the cathode, produce hydrogen on the cathode side. Production of hydrogen on the cathode side can include reduction of the protons on the cathode side. The hydrogen sulfide entering the anode side can have a space velocity in a range of from about 1,000 per hour to about 50,000 per hour through the anode side. The membrane can have a thickness in a range of from about 1 micrometer to about 500 micrometers. The membrane can include a polymer proton-exchange membrane. The polymer proton-exchange membrane can be an electrical insulator. The polymer proton-exchange membrane can be configured to conduct protons. The electrochemical cell can be configured to operate at an operating temperature in a range of from about 25° C. to about 100° C. The voltage applied across the anode and the cathode can have a voltage in a range of from about 1 V to about 3 V. The system can include a heater that is coupled to the electrochemical cell. The heater can be configured to heat the electrochemical cell (for example, the anode side of the electrochemical cell) to a sulfur melting temperature of about 150° C. to liquefy the sulfur, such that the sulfur can flow out of the anode side. The anode side of the electrochemical cell can be configured to operate liquid full.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure relates to electrolysis of hydrogen sulfide ($H_2S$) to produce sulfur and hydrogen. Elemental sulfur is produced on the anode side of the system. The system includes a proton membrane that is permeable to hydrogen protons. The hydrogen protons are reduced on the cathode side of the system.

The subject matter described in this disclosure can be implemented in particular implementations, so as to realize one or more of the following advantages. Hydrogen sulfide, which is a poisonous, corrosive, flammable, and explosive compound, can be converted into hydrogen and elemental sulfur, both of which are useful commercial products. The systems and methods described can be implemented to economically convert hydrogen sulfide into more useful products via electrolysis. Because the hydrogen sulfide is in liquid form prior to conversion into hydrogen and elemental sulfur, a greater amount of hydrogen sulfide can be converted on a volume basis in comparison to conversion of gaseous hydrogen sulfide. Further, smaller equipment may be used to process liquid hydrogen sulfide in comparison to gaseous hydrogen sulfide due to the large difference in density of the two states of hydrogen sulfide. Additionally, the systems and methods described convert liquid hydrogen sulfide as opposed to aqueous hydrogen sulfide (that is, hydrogen sulfide that is dissolved in water), which is highly corrosive. By using liquid hydrogen sulfide (as opposed to aqueous hydrogen sulfide), use of materials that are corrosion-resistant and typically expensive can be avoided. Finally, elemental sulfur is soluble in liquid hydrogen sulfide, which can simplify design and facilitate transportation of the sulfur product. Thus, the systems and methods described can be implemented to realize environmental, safety, and commercial advantages.

Figure 1A:
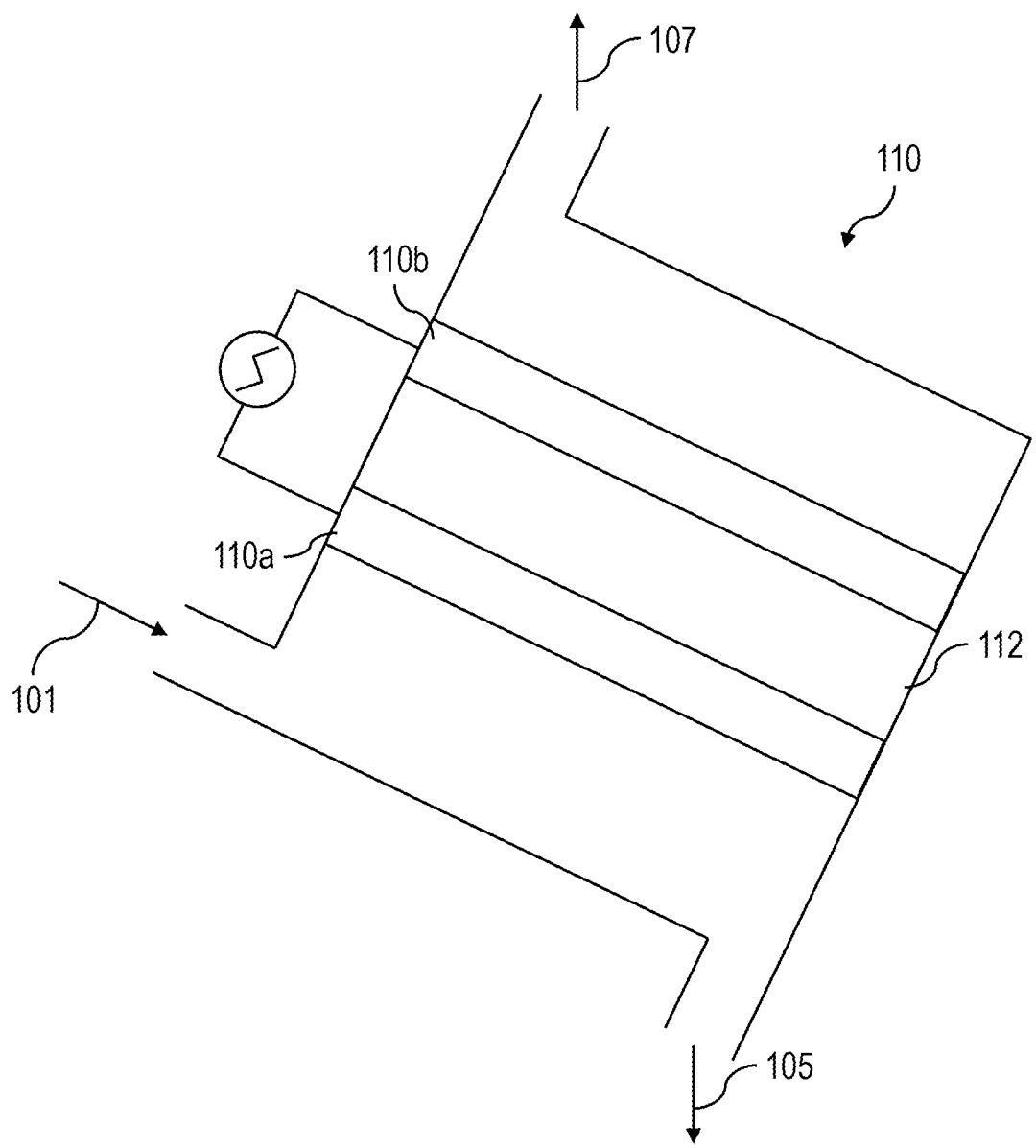
FIG. 1A is a schematic diagram of an example system for hydrogen sulfide conversion.

FIG. 1A depicts an example system 100A for converting hydrogen sulfide into elemental sulfur. The system 100A includes an electrochemical cell 110. The electrochemical cell 110 includes an anode 110a, a cathode 110b, and a membrane 112. The anode 110a is at least partially disposed in an anode side of the electrochemical cell 110. The anode 110a can include, for example, a metal sulfide (such as tungsten disulfide ($WS_2$), cobalt sulfide ($CoS_{1.035}$), or lithium sulfide ($Li_2S$)) or a metal oxide that is converted into its corresponding sulfide (for example, lithium cobalt oxide ($LiCoO_2$) converted to lithium sulfide/cobalt sulfide ($Li_2S$/$CoS_{1.035}$)) in response to exposure to the high temperature hydrogen sulfide environment on the anode side of the electrochemical cell 110. The cathode 110b is at least partially disposed in a cathode side of the electrochemical cell 110. The cathode 110b can include, for example, a metal or a metal oxide. In some implementations, the anode 110a and the cathode 110b are made of the same material. The membrane 112 separates the anode side of the electrochemical cell 110 from the cathode side of the electrochemical cell 110. The membrane 112 is in contact with the anode 110a on the anode side of the electrochemical cell 110. The membrane 112 is in contact with the cathode 110b on the cathode side of the electrochemical cell 110. In some implementations, as shown in FIG. 1A, the membrane 112 is sandwiched between the anode 110a and the cathode 110b. The membrane 112 is configured to prevent flow of hydrogen sulfide, sulfur, and electrons from passing through the membrane 112 while allowing cations (such as hydrogen protons) to pass through the membrane 112. That is, hydrogen sulfide and sulfur cannot pass from one side of the electrochemical cell 110 to the other through the membrane 112, but protons can pass freely between sides of the electrochemical cell 110 through the membrane 112. Thus, the membrane 112 is a proton ion exchange membrane. For example, the membrane 112 is configured to allow protons to pass from the anode side through the membrane 112 to the cathode side. The membrane 112 can be, for example, a polymer proton ion exchange membrane. The membrane 112 can, for example, be made of a polymer (for example, made of ionomers) that is an electrical insulator while also being conductive to protons (that is, allow passage of protons across the membrane 112). In some implementations, the membrane 112 includes a pure polymer membrane or a composite membrane, in which other materials are embedded in a polymer matrix. For example, the membrane 112 can include a fluoropolymer, such as a sulfonated tetrafluoroethylene-based fluoropolymer-copolymer. For example, the membrane 112 can include a polyaromatic polymer. For example, the membrane 112 can include a partially fluorinated polymer. In some implementations, the membrane 112 has a thickness in a range of from about 1 micrometer to about 500 micrometers.

The system 100A includes a hydrogen sulfide stream 101 entering the anode side of the electrochemical cell 110. The hydrogen sulfide stream 101 includes hydrogen sulfide in a liquid state (that is, liquefied hydrogen sulfide). In some implementations, the anode side of the electrochemical cell 110 is configured to operate liquid full (that is, full of liquid). In some implementations, the hydrogen sulfide stream 101 includes an electrolyte, such as a mixed ion-conducting electrolyte. In some implementations, the hydrogen sulfide stream 101 entering the anode side of the electrochemical cell 110 has a space velocity in a range of from about 1,000 per hour to about 50,000 per hour through the anode side of the electrochemical cell 110. Space velocity is defined as a ratio of the volumetric flow rate of the reactant (in this case, hydrogen sulfide) to the reactor volume (in this case, the anode side of the electrochemical cell 110).

Applying a voltage across the electrodes (110a, 110b) of the electrochemical cell 110 facilitates reactions on the anode side and the cathode side of the electrochemical cell 110 to occur. In response to a voltage applied across the electrodes (110a, 110b), the electrochemical cell 110 is configured to perform electrolysis on the hydrogen sulfide from the hydrogen sulfide stream 101 to produce sulfur and protons (that is, hydrogen protons) on the anode side of the electrochemical cell 110. In response to a voltage applied across the electrodes (110a, 110b), the electrochemical cell 110 is configured to produce hydrogen on the cathode side of the electrochemical cell 110. The reaction shown in Equation 1a occurs on the anode side of the electrochemical cell 110, and the reaction shown in Equation 1b occurs on the cathode side of the electrochemical cell 110.

$$2H_2S \rightarrow 2S + 4H^+ + 4e^- \tag{1a}$$

$$4H^+ + 4e^- \rightarrow 2H_2 \tag{1b}$$

The reaction shown in Equation 1a is the electrolysis of hydrogen sulfide to produce elemental sulfur. The membrane 112 prevents the sulfur produced in the anode side of the electrochemical cell 110 from flowing to the cathode side of the electrochemical cell 110. The membrane 112 prevents the hydrogen produced in the cathode side of the electrochemical cell 110 from flowing to the anode side of the electrochemical cell 110. Sulfur 105 produced in the anode side of the electrochemical cell 110 exits the anode side of the electrochemical cell 110. Hydrogen 107 produced in the cathode side of the electrochemical cell 110 exits the cathode side of the electrochemical cell 110. The reaction shown in Equation 1b is the reduction of hydrogen protons to produce hydrogen gas. In some implementations, the voltage applied across the electrodes (110a, 110b) of the electrochemical cell 110 has a voltage that is in a range of from about 1 volt (V) to about 3 V.

In some implementations, the electrochemical cell 110 is configured to operate at an operating pressure in a range of from about 2,070 kilopascals (kPa) to about 121,590 kPa or from about 2,070 kPa to about 2,760 kPa. In some implementations, the electrochemical cell 110 is configured to operate at an operating temperature in a range of from about 25 degrees Celsius (° C.) to about 100° C. or from about 25° C. to about 90° C. In some implementations, the system 100A includes a heater 120 that is coupled to the electrochemical cell 110. For example, the heater 120 can be coupled to the anode side of the electrochemical cell 110. The heater 120 can be configured to heat the electrochemical cell 110 (for example, the anode side of the electrochemical cell 110) to a sulfur melting temperature of about 150° C. to liquefy the sulfur that has formed in the anode side of the electrochemical cell 110. In some implementations, the heater 120 intermittently heats the electrochemical cell 110 (for example, the anode side of the electrochemical cell 110) to the sulfur melting temperature of about 150° C. between cycles to liquefy the sulfur that has formed and transport the sulfur out of the anode side of the electrochemical cell 110. The heater 120 can therefore facilitate transport of sulfur 105 out of the anode side of the electrochemical cell 110. In some implementations, as shown in FIG. 1A, the electrochemical cell 110 is sloped to facilitate drainage of sulfur out of the anode side of the electrochemical cell 110. In some implementations, a bottom wall of the anode side of the electrochemical cell 110 is sloped and an outlet drain is located near or at the bottom of the sloped wall to facilitate drainage of sulfur out of the anode side of the electrochemical cell 110.

Figure 1B:
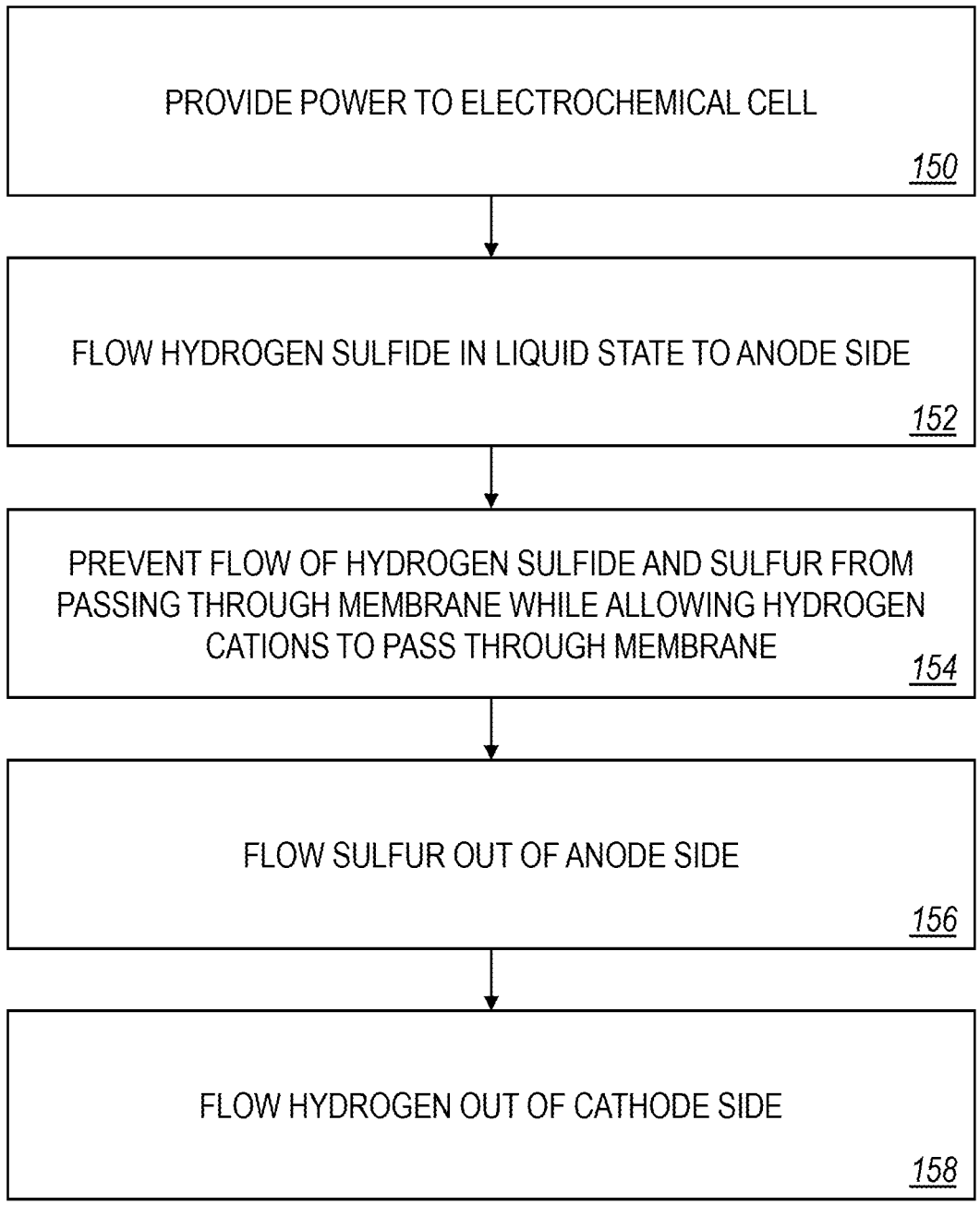
FIG. 1B is a flow chart of an example method for hydrogen sulfide conversion.

FIG. 1B is a flow chart of an example method 100B for converting hydrogen sulfide into elemental sulfur. The system 100A can, for example, implement the method 100B. In some implementations, the method 100B is implemented by the system 100A, with the electrochemical cell 110 operating at an operating temperature in a range of from about 25° C. to about 100° C. and an operating pressure of about 2,070 kPa, and the anode side of the electrochemical cell 110 operating liquid full. At block 150, power is provided to an electrochemical cell (such as the electrochemical cell 110). As described previously, the electrochemical cell 110 includes an anode side and a cathode side. In some implementations, the power provided to the electrochemical cell 110 at block 150 is applied across the electrodes (110a, 110b) and has a voltage in a range of from about 1 V to about 3 V. At block 152, hydrogen sulfide in a liquid state (such as the hydrogen sulfide stream 101) is flowed to the anode side of the electrochemical cell 110. Providing power to the electrochemical cell 110 at block 150 facilitates electrolysis of the hydrogen sulfide of the hydrogen sulfide stream 101 (Equation 1a) to produce sulfur (such as the sulfur 105) and protons on the anode side of the electrochemical cell 110. Providing power to the electrochemical cell 110 at block 150 facilitates reduction of hydrogen protons (Equation 1b) to produce hydrogen gas (such as the hydrogen 107) on the cathode side of the electrochemical cell 110. At block 154, a membrane (such as the membrane 112) prevents flow of hydrogen sulfide and sulfur from passing through the membrane 112 while allowing hydrogen cations (protons) to pass through the membrane 112. As described previously, the membrane 112 separates the anode side from the cathode side of the electrochemical cell 110. The hydrogen cations (protons) produced on the anode side of the electrochemical cell 110 can pass through the membrane 112 to the cathode side of the electrochemical cell 110 and then be reduced on the cathode side of the electrochemical cell 110 to produce hydrogen. At block 156, sulfur 105 is flowed out of the anode side of the electrochemical cell 110. At block 158, hydrogen 107 is flowed out of the cathode side of the electrochemical cell 110. In some implementations, after the sulfur has been produced, the electrochemical cell 110 (for example, the anode side of the electrochemical cell 110) is heated to a sulfur melting temperature of about 150° C. to liquefy the sulfur that has formed in the anode side of the electrochemical cell 110.

Figure 2A:
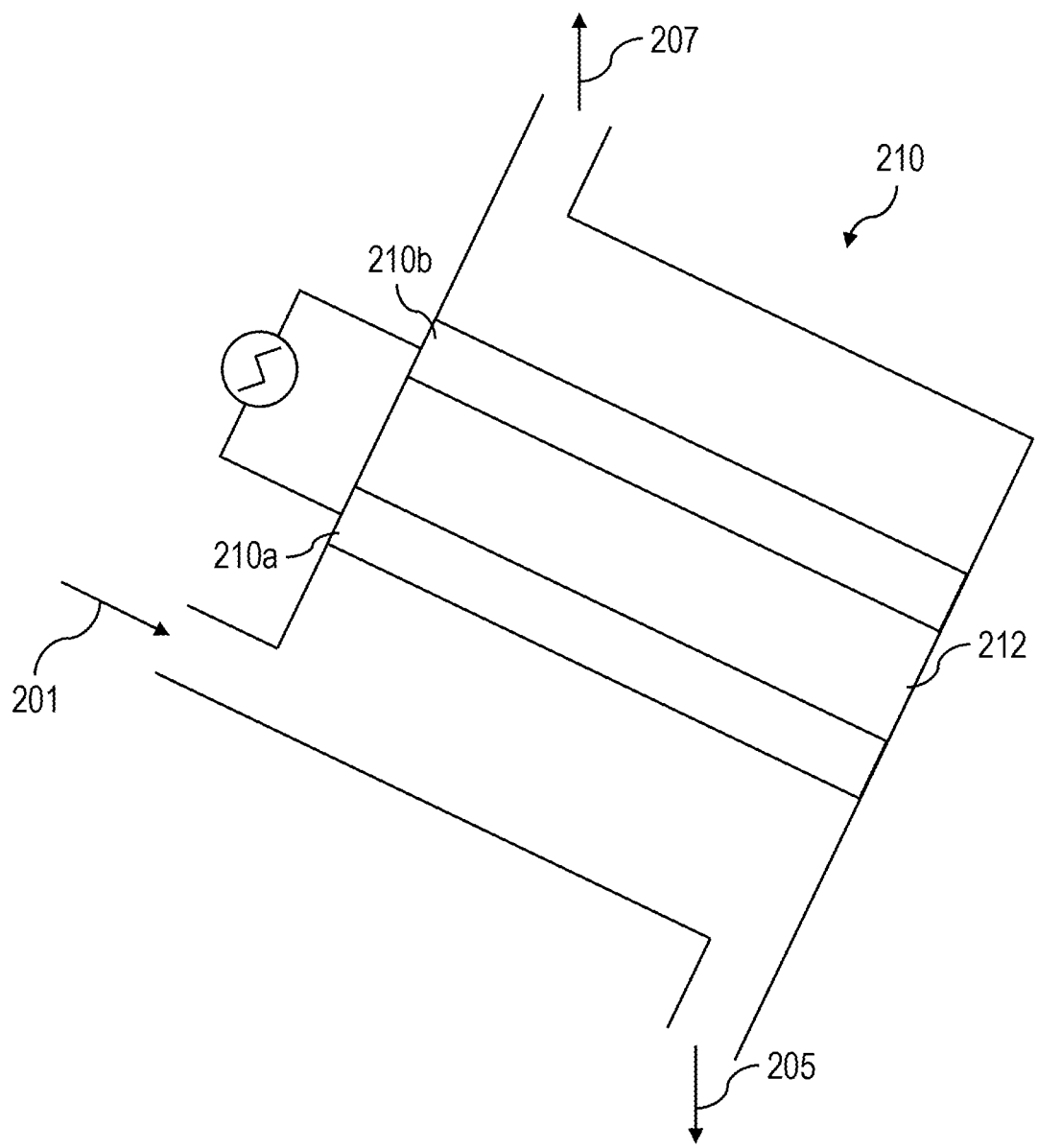
FIG. 2A is a schematic diagram of an example system for hydrogen sulfide conversion.

FIG. 2A depicts an example system 200A for converting hydrogen sulfide into elemental sulfur. The system 200A can be substantially similar to the system 100A shown in FIG. 1A. The system 200A includes an electrochemical cell 210. The electrochemical cell 210 includes an anode 210a, a cathode 210b, and a membrane 212. The anode 210a is at least partially disposed in an anode side of the electrochemical cell 210. The anode 210a can include, for example, a metal sulfide (such as tungsten disulfide ($WS_2$), cobalt sulfide ($CoS_{1.035}$), or lithium sulfide ($Li_2S$)) or a metal oxide that is converted into its corresponding sulfide (for example, lithium cobalt oxide ($LiCoO_2$) converted to lithium sulfide/cobalt sulfide ($Li_2S/CoS_{1.035}$)) in response to exposure to the high temperature hydrogen sulfide environment on the anode side of the electrochemical cell 210. The cathode 210b is at least partially disposed in a cathode side of the electrochemical cell 210. The cathode 210b can include, for example, a perovskite-type material, such as lanthanum-strontium-manganese-chromiud oxide (LSCM). For example, the cathode 210b has a general chemical composition of $La_{1-x}Sr_xCr_{1-y}M_yO_3$, where M is manganese, iron, cobalt, or nickel. The membrane 212 separates the anode side of the electrochemical cell 210 from the cathode side of the electrochemical cell 210. The membrane 212 is in contact with the anode 210a on the anode side of the electrochemical cell 210. The membrane 212 is in contact with the cathode 210b on the cathode side of the electrochemical cell 210. In some implementations, as shown in FIG. 2A, the membrane 212 is sandwiched between the anode 210a and the cathode 210b. The membrane 212 is configured to prevent flow of hydrogen sulfide, sulfur, and electrons from passing through the membrane 212 while allowing cations (such as hydrogen protons) to pass through the membrane 212. That is, hydrogen sulfide and sulfur cannot pass from one side of the electrochemical cell 210 to the other through the membrane 212, but protons can pass freely between sides of the electrochemical cell 210 through the membrane 212. Thus, the membrane 212 is a proton exchange membrane. For example, the membrane 212 is configured to allow protons to pass from the anode side through the membrane 212 to the cathode side. The membrane 212 can be, for example, a ceramic proton exchange membrane. The membrane 212 can, for example, be made of a perovskite oxide that is an electrical insulator while also being conductive to protons (that is, allow passage of protons across the membrane 212). In some implementations, the membrane 212 includes a pure polymer membrane or a composite membrane, in which other materials are embedded in a polymer matrix. In some implementations, the membrane 212 has a thickness in a range of from about 10 micrometers to about 5 millimeters.

The system 200A includes a hydrogen sulfide stream 201 entering the anode side of the electrochemical cell 210. The hydrogen sulfide stream 201 includes hydrogen sulfide in a liquid state. In some implementations, the anode side of the electrochemical cell 210 is configured to operate liquid full (that is, full of liquid). In some implementations, the hydrogen sulfide stream 201 includes an electrolyte, such as a mixed ion-conducting electrolyte. Some non-limiting examples of electrolytes that can be included in the anode side of the electrochemical cell 210 include strontium-cerium-ytterbium oxide ($SrCe_{0.95}Yb_{0.05}O_3$), calcium-indium-zirconium oxide ($CaIn_{0.1}Zr_{0.9}O_{3-\alpha}$), and barium-zirconium-cerium-yttrium-ytterbium oxide ($BaZr_{0.4}Ce_{0.4}Y_{0.1}Yb_{0.1}O_{3-\delta}$). In some implementations, the hydrogen sulfide stream 201 entering the anode side of the electrochemical cell 210 has a space velocity in a range of from about 1,000 per hour to about 50,000 per hour through the anode side of the electrochemical cell 210.

Applying a voltage across the electrodes (210a, 210b) of the electrochemical cell 210 facilitates reactions on the anode side and the cathode side of the electrochemical cell 110 to occur. In response to a voltage applied across the electrodes (210a, 210b), the electrochemical cell 210 is configured to perform electrolysis on the hydrogen sulfide from the hydrogen sulfide stream 201 to produce sulfur and protons (that is, hydrogen protons) on the anode side of the electrochemical cell 210. In response to a voltage applied across the electrodes (210a, 210b), the electrochemical cell 210 is configured to produce hydrogen on the cathode side of the electrochemical cell 210. The reaction shown in Equation 1a occurs on the anode side of the electrochemical cell 210, and the reaction shown in Equation 1b occurs on the cathode side of the electrochemical cell 210. The reaction shown in Equation 1a is the electrolysis of hydrogen sulfide to produce elemental sulfur. The reaction shown in Equation 1b is the reduction of hydrogen protons to produce hydrogen gas. The membrane 212 prevents the sulfur produced in the anode side of the electrochemical cell 210 from flowing to the cathode side of the electrochemical cell 210. The membrane 212 prevents the hydrogen produced in the cathode side of the electrochemical cell 210 from flowing to the anode side of the electrochemical cell 210. Sulfur 205 produced in the anode side of the electrochemical cell 210 exits the anode side of the electrochemical cell 210. Hydrogen 207 produced in the cathode side of the electrochemical cell 210 exits the cathode side of the electrochemical cell 210. In some implementations, the voltage applied across the electrodes (210a, 210b) of the electrochemical cell 210 has a voltage that is in a range of from about 1 V to about 3 V.

In some implementations, the electrochemical cell 210 is configured to operate at an operating pressure of about 152,000 kPa to about 202,650 kPa. In some implementations, the electrochemical cell 210 is configured to operate at an operating temperature in a range of from about 200° C. to about 500° C. For example, the electrochemical cell 210 can be configured to operate at an operating temperature of about 300° C. The combination of operating pressure and operating temperature of the electrochemical cell 210 causes the hydrogen sulfide in the anode side of the electrochemical cell 210 to be in a supercritical state. The high operating temperature for maintaining the supercritical state of the hydrogen sulfide in the anode side of the electrochemical cell 210 facilitates conductivity of the membrane 212, which ensures that the reactions occurring on the surfaces of the anode 210a and the cathode 210b are electro-chemical reactions and not simply conventional chemical reactions. In electrochemical reactions (as distinguished from conventional chemical reactions), electrons are not transferred directly between atoms, ions, or molecules, but via an electronically-conducting circuit (such as the anode 210a—membrane 212—cathode 210b sandwich). The supercritical state of the hydrogen sulfide in the anode side of the electrochemical cell 210 also prevents the formation of sulfuric acid in the anode side of the electrochemical cell 210. In some implementations, the system 200A includes a heater 220 that is coupled to the electrochemical cell 210. For example, the heater 220 can be coupled to the anode side of the electrochemical cell 210. The heater 220 can be configured to heat the electrochemical cell 210 (for example, the anode side of the electrochemical cell 210) to maintain the operating temperature in the anode side of the electrochemical cell 210 to be sufficiently hot to cause the hydrogen sulfide in the anode side of the electrochemical cell 210 to be in a supercritical state. In some implementations, as shown in FIG. 2A, the electrochemical cell 210 is sloped to facilitate drainage of sulfur 205 out of the anode side of the electrochemical cell 210. In some implementations, a bottom wall of the anode side of the electrochemical cell 210 is sloped and an outlet drain is located near or at the bottom of the sloped wall to facilitate drainage of sulfur 205 out of the anode side of the electrochemical cell 210.

Figure 2B:
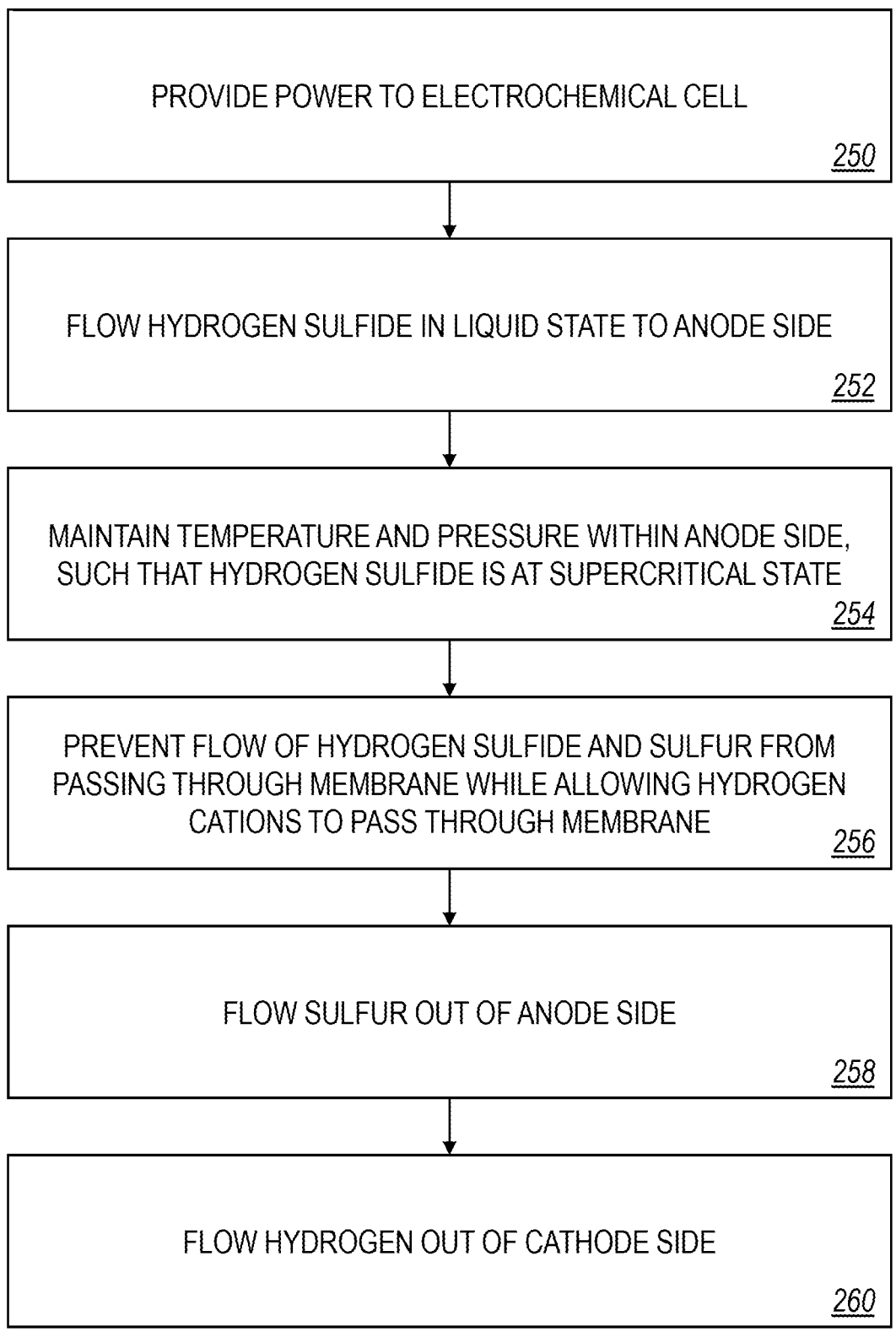
FIG. 2B is a flow chart of an example method for hydrogen sulfide conversion.

FIG. 2B is a flow chart of an example method 200B for converting hydrogen sulfide into elemental sulfur. The system 200A can, for example, implement the method 200B. In some implementations, the method 200B is implemented by the system 200A, with the electrochemical cell 210 operating at an operating temperature in a range of from about 200° C. to about 500° C. and an operating pressure in a range of from about 152,000 kPa to about 202,650 kPa, and the anode side of the electrochemical cell 210 operating liquid full. At block 250, power is provided to an electrochemical cell (such as the electrochemical cell 210). As described previously, the electrochemical cell 210 includes an anode side and a cathode side. In some implementations, the power provided to the electrochemical cell 210 at block 250 is applied across the electrodes (210a, 210b) and has a voltage in a range of from about 1 V to about 3 V. At block 252, hydrogen sulfide in a liquid state (such as the hydrogen sulfide stream 201) is flowed to the anode side of the electrochemical cell 210. At block 254, the operating temperature and the operating pressure are maintained within the anode side of the electrochemical cell 210, such that the hydrogen sulfide in the anode side of the electrochemical cell 210 is at a supercritical state. That is, the combination of the operating temperature and the operating pressure is above/beyond the critical point of hydrogen sulfide. In some implementations, the operating temperature is maintained in a range of from about 200° C. to about 500° C., and the operating pressure is maintained in a range of from about 152,000 kPa to about 202,650 kPa at block 254. Providing power to the electrochemical cell 210 at block 250 facilitates electrolysis of the hydrogen sulfide of the hydrogen sulfide stream 201 (Equation 1a) to produce sulfur (such as the sulfur 205) and protons on the anode side of the electrochemical cell 210. Providing power to the electrochemical cell 210 at block 250 facilitates reduction of hydrogen protons (Equation 1b) to produce hydrogen gas (such as the hydrogen 207) on the cathode side of the electrochemical cell 210. At block 256, a membrane (such as the membrane 212) prevents flow of hydrogen sulfide and sulfur from passing through the membrane 212 while allowing hydrogen cations (protons) to pass through the membrane 212. As described previously, the membrane 212 separates the anode side from the cathode side of the electrochemical cell 210. The hydrogen cations (protons) produced on the anode side of the electrochemical cell 210 can pass through the membrane 212 to the cathode side of the electrochemical cell 210 and then be reduced on the cathode side of the electrochemical cell 210 to produce hydrogen. At block 258, sulfur 205 is flowed out of the anode side of the electrochemical cell 210. At block 260, hydrogen 207 is flowed out of the cathode side of the electrochemical cell 210.

Figure 3A:
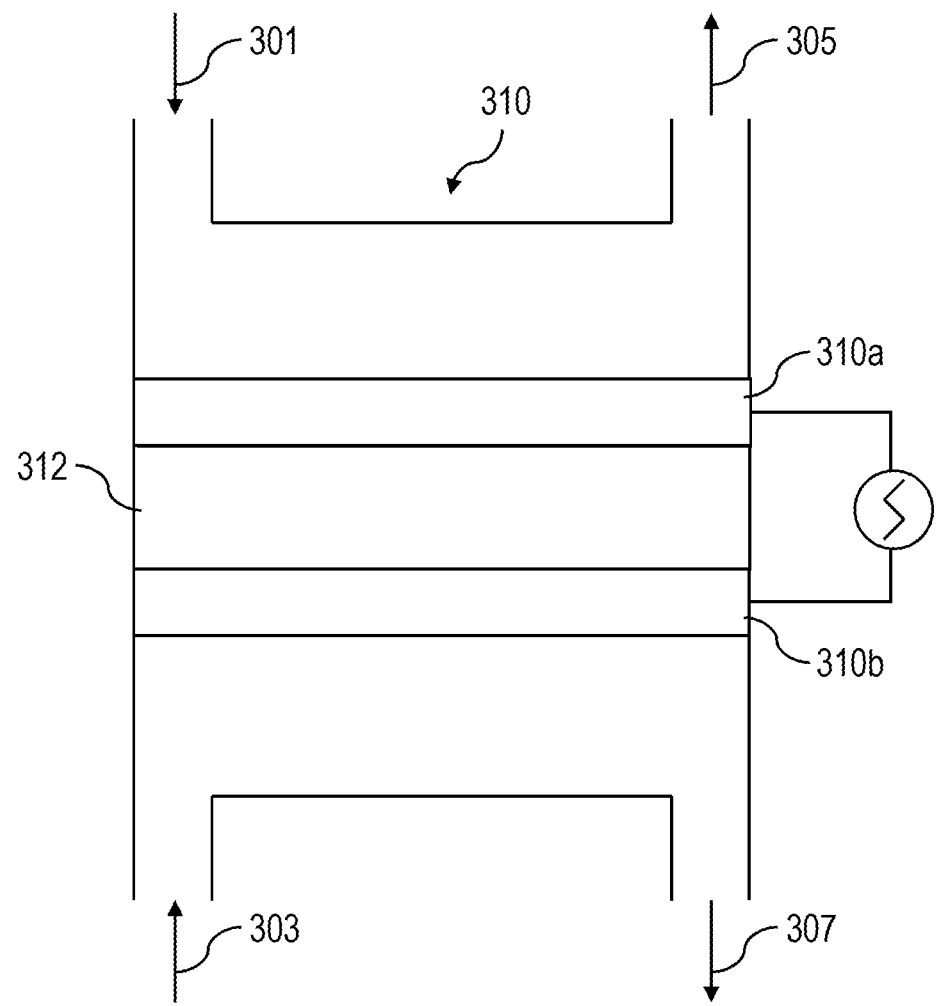
FIG. 3A is a schematic diagram of an example system for hydrogen sulfide conversion.

FIG. 3A depicts an example system 300A for converting hydrogen sulfide into sulfur dioxide. The system 300A can be substantially similar to the systems 100A and 200A shown in FIGS. 1A and 2A, respectively. The system 300A includes an electrochemical cell 310. The electrochemical cell 310 includes an anode 310a, a cathode 310b, and a membrane 312. The anode 310a is at least partially disposed in an anode side of the electrochemical cell 310. The anode 310a can include, for example, a metal sulfide (such as tungsten disulfide ($WS_2$), cobalt sulfide ($CoS_{1.035}$), or lithium sulfide ($Li_2S$)) or a metal oxide that is converted into its corresponding sulfide (for example, lithium cobalt oxide ($LiCoO_2$) converted to lithium sulfide/cobalt sulfide ($Li_2S$/$CoS_{1.035}$)) in response to exposure to the high temperature hydrogen sulfide environment on the anode side of the electrochemical cell 310. The cathode 310b is at least partially disposed in a cathode side of the electrochemical cell 310. The cathode 310b can include, for example, a perovskite-type material, such as lanthanum-strontium-manganese-chromiud oxide (LSCM). For example, the cathode 310b has a general chemical composition of $La_{1-x}Sr_xCr_{1-y}M_yO_3$, where M is manganese, iron, cobalt, or nickel. The membrane 312 separates the anode side of the electrochemical cell 310 from the cathode side of the electrochemical cell 310. The membrane 312 is in contact with the anode 310a on the anode side of the electrochemical cell 310. The membrane 312 is in contact with the cathode 310b on the cathode side of the electrochemical cell 310. In some implementations, as shown in FIG. 3A, the membrane 312 is sandwiched between the anode 310a and the cathode 310b. The membrane 312 is configured to prevent flow of hydrogen sulfide, sulfur dioxide, and water from passing through the membrane 312 while allowing cations (such as hydrogen protons) and anions (such as oxygen ions) to pass through the membrane 312. That is, hydrogen sulfide, sulfur dioxide, and water cannot pass from one side of the electrochemical cell 310 to the other through the membrane 312, but protons and oxygen ions can pass freely between sides of the electrochemical cell 310 through the membrane 312. Thus, the membrane 312 is a hybrid membrane. For example, the membrane 312 is configured to allow protons to pass from the anode side through the membrane 312 to the cathode side. The membrane 312 can be, for example, a ceramic ion conductor membrane. The membrane 312 can, for example, be made of a barium-zirconium-cerium-yttrium-ytterbium oxide (such as $BaZr_{0.4}Ce_{0.4}Y_{0.1}Yb_{0.1}O_{0.1}$, $BaZr_{0.4}Ce_{0.4}Y_{0.1}Yb_{0.1}O_{3-\delta}$, or $BaZr_{0.1}Ce_{0.7}Y_{0.1}Yb_{0.1}O_{0.1}$) that is conductive to protons (that is, allow passage of protons across the membrane 312). For example, the membrane 312 can include barium carbonate, zirconium oxide, cerium oxide, ytterbium oxide, yttrium oxide, or any combination of these. In some implementations, the membrane 312 has a thickness in a range of from about 10 micrometers to about 5 millimeters.

The system 300A includes a hydrogen sulfide stream 301 entering the anode side of the electrochemical cell 310. The hydrogen sulfide stream 301 includes hydrogen sulfide dissolved in water. Thus, the hydrogen sulfide stream 301 can be an aqueous solution of hydrogen sulfide. In some implementations, the anode side of the electrochemical cell 310 is configured to operate liquid full (that is, full of liquid). In some implementations, the hydrogen sulfide stream 301 includes an electrolyte, such as a mixed ion-conducting electrolyte. A non-limiting example of electrolytes that can be included in the anode side of the electrochemical cell 310 is a barium-zirconium-cerium-yttrium-ytterbium oxide (such as $BaZr_{0.4}Ce_{0.4}Y_{0.1}Yb_{0.1}O_{0.1}$, $BaZr_{0.4}Ce_{0.4}Y_{0.1}Yb_{0.1}O_{3-\delta}$, or $BaZr_{0.1}Ce_{0.7}Y_{0.1}Yb_{0.1}O_{0.1}$). In some implementations, the hydrogen sulfide stream 301 entering the anode side of the electrochemical cell 310 has a space velocity in a range of from about 1,000 per hour to about 50,000 per hour through the anode side of the electrochemical cell 310.

The system 300A includes a water stream 303 entering the cathode side of the electrochemical cell 310. The water stream 303 entering the cathode side of the electrochemical cell 310 is in a vapor state (that is, the water stream 303 includes steam). Applying a voltage across the electrodes (310a, 310b) of the electrochemical cell 310 facilitates reactions on the anode side and the cathode side of the electrochemical cell 110 to occur. In response to a voltage applied across the electrodes (310a, 310b), the electrochemical cell 310 is configured to oxidize the hydrogen sulfide from the hydrogen sulfide stream 301 to produce sulfur dioxide and protons (that is, hydrogen protons) on the anode side of the electrochemical cell 310. In response to a voltage applied across the electrodes (310a, 310b), the electrochemical cell 310 is configured to electrolyze the water from the water stream 303 and produce hydrogen on the cathode side of the electrochemical cell 310. The reaction shown in Equation 2a occurs on the anode side of the electrochemical cell 310, and the reactions shown in Equations 2b and 2c occur on the cathode side of the electrochemical cell 310.

$$2H_2S + 2O^{2-} + 2H_2O \rightarrow 2SO_2 + 8H^+ + 12e^- \qquad (2a)$$

$$2H_2O + 4e^- \rightarrow 2H_2 + 2O^{2-} \qquad (2b)$$

$$8H^+ + 8e^- \rightarrow 4H_2 \qquad (2c)$$

The reaction shown in Equation 2a is the oxidation of hydrogen sulfide to produce sulfur dioxide. The reaction shown in Equation 2b is the hydrolysis of water to produce hydrogen gas and oxygen ions. The reaction shown in Equation 2c is the reduction of hydrogen protons to produce hydrogen gas. The membrane 312 prevents the sulfur dioxide produced in the anode side of the electrochemical cell 310 from flowing to the cathode side of the electrochemical cell 310. The membrane 312 prevents the hydrogen produced in the cathode side of the electrochemical cell 310 from flowing to the anode side of the electrochemical cell 310. Sulfur dioxide 305 produced in the anode side of the electrochemical cell 310 exits the anode side of the electrochemical cell 310. Hydrogen 307 produced in the cathode side of the electrochemical cell 310 exits the cathode side of the electrochemical cell 310. In some implementations, the voltage applied across the electrodes (310a, 310b) of the electrochemical cell 310 has a voltage that is in a range of from about 1 V to about 3 V.

In some implementations, the electrochemical cell 310 is configured to operate at ambient pressure (for example, about 101 kPa). In some implementations, the electrochemical cell 310 is configured to operate at an operating temperature in a range of from about 500° C. to about 900° C.

or from about 600° C. to about 800° C. For example, the electrochemical cell 310 can be configured to operate at an operating temperature of about 900° C. In some implementations, the system 300A includes a heater 320 that is coupled to the electrochemical cell 310. For example, the heater 320 can be coupled to the anode side of the electrochemical cell 310. The heater 320 can be configured to heat the electrochemical cell 310 (for example, the anode side of the electrochemical cell 310) to maintain the operating temperature in the anode side of the electrochemical cell 310 for optimal sulfur dioxide and hydrogen production.

In some implementations, the system 300A includes a reactor 330 downstream of the electrochemical cell 310. The reactor 330 can include a metal oxide catalyst. The catalyst included in the reactor 330 can include, for example, a vanadium- or a carbon-based catalyst. The reactor 330 is configured to receive the sulfur dioxide 305 from the anode side of the electrochemical cell 310. In response to contacting the sulfur dioxide 305, the catalyst in the reactor 330 can convert at least a portion of the sulfur dioxide into sulfuric acid. The catalytic reactions shown in Equations 3a and 3b can occur in the reactor 330 to convert the sulfur dioxide into sulfuric acid.

$$SO_2 + \tfrac{1}{2}O_2 \rightarrow SO_3 \tag{3a}$$

$$SO_3 + H_2O \rightarrow H_2SO_4 \tag{3b}$$

The reaction shown in Equation 3a is the oxidation of sulfur dioxide into sulfur trioxide. The reaction shown in Equation 3b is the reaction of sulfur trioxide with water to form sulfuric acid. Sulfuric acid can be used in producing various products—some non-limiting examples include plastic production, polymer production, and electrolyte production for batteries.

Figure 3B:
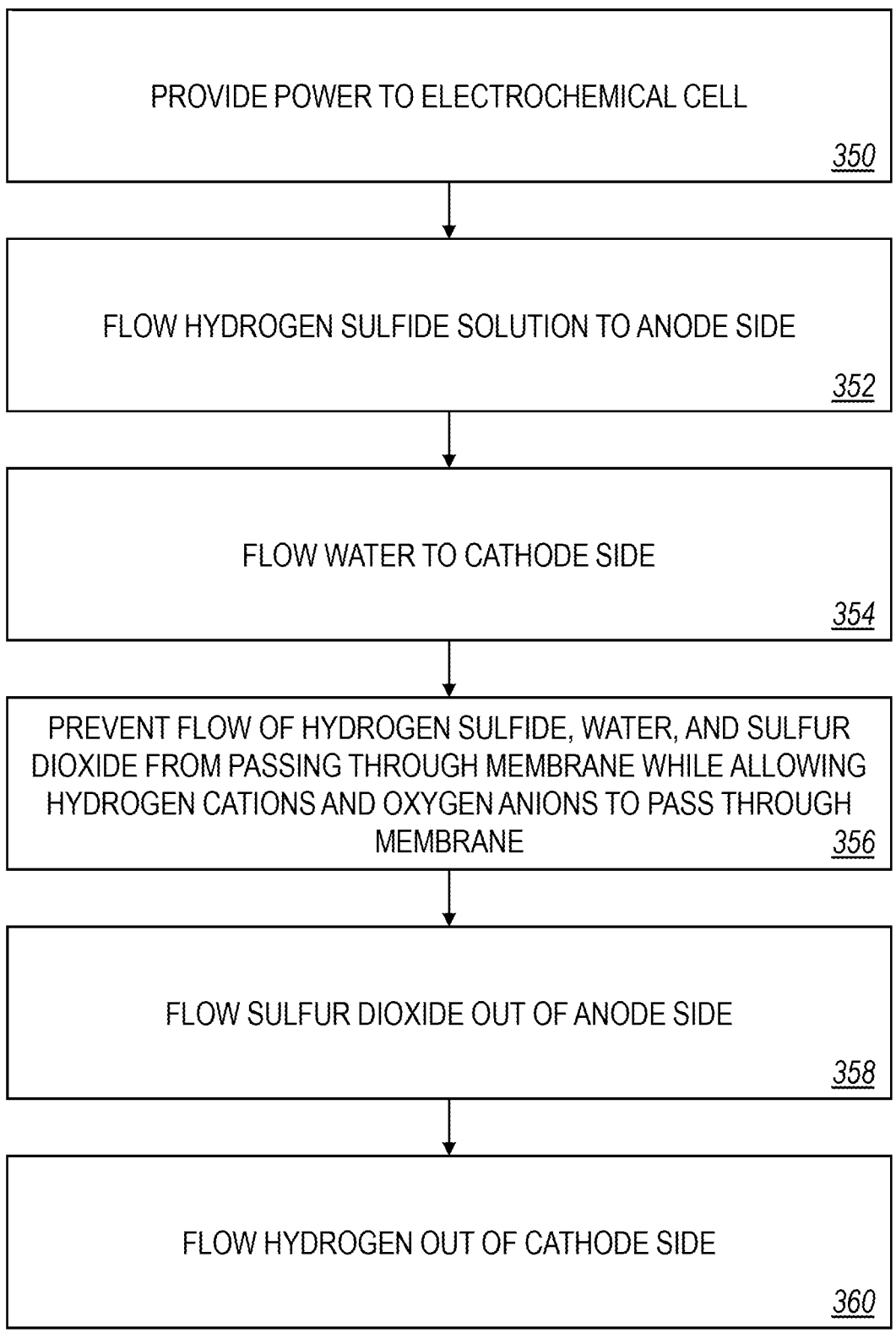
FIG. 3B is a flow chart of an example method for hydrogen sulfide conversion.

FIG. 3B is a flow chart of an example method 300B for converting hydrogen sulfide into sulfur dioxide. The system 300A can, for example, implement the method 300B. In some implementations, the method 300B is implemented by the system 300A, with the electrochemical cell 310 operating at an operating temperature in a range of from about 600° C. to about 900° C., and the anode side of the electrochemical cell 310 operating liquid full. At block 350, power is provided to an electrochemical cell (such as the electrochemical cell 310). As described previously, the electrochemical cell 310 includes an anode side and a cathode side. In some implementations, the power provided to the electrochemical cell 310 at block 350 is applied across the electrodes (310a, 310b) and has a voltage in a range of from about 1 V to about 3 V. At block 352, a solution (such as the hydrogen sulfide stream 301) is flowed to the anode side of the electrochemical cell 310. As described previously, the hydrogen sulfide stream 301 includes hydrogen sulfide dissolved in water. At block 354, water (such as the water 303) is flowed to the cathode side of the electrochemical cell 310. Providing power to the electrochemical cell 310 at block 350 facilitates oxidation of the hydrogen sulfide of the hydrogen sulfide stream 301 (Equation 2a) to produce sulfur dioxide and protons on the anode side of the electrochemical cell 310. Providing power to the electrochemical cell 310 at block 350 facilitates electrolysis of the water of the water 303 (Equation 2b) and reduction of hydrogen protons (Equation 2c) to produce hydrogen gas on the cathode side of the electrochemical cell 310. At block 356, a membrane (such as the membrane 312) prevents flow of hydrogen sulfide, sulfur dioxide, and water from passing through the membrane 312 while allowing hydrogen cations (protons) and oxygen anions to pass through the membrane 312. As described previously, the membrane 312 separates the anode side from the cathode side of the electrochemical cell 310. The hydrogen cations (protons) produced on the anode side of the electrochemical cell 310 can pass through the membrane 312 to the cathode side of the electrochemical cell 310 and then be reduced on the cathode side of the electrochemical cell 310 to produce hydrogen. The oxygen anions produced on the cathode side of the electrochemical cell 310 can pass through the membrane 312 to the anode side of the electrochemical cell 310 and then be used to oxidize the sulfur on the anode side of the electrochemical cell 310 to produce sulfur dioxide. At block 358, sulfur dioxide (such as the sulfur dioxide 305) is flowed out of the anode side of the electrochemical cell 310. At block 360, hydrogen (such as the hydrogen 307) is flowed out of the cathode side of the electrochemical cell 310. In some implementations, the method 300B includes converting at least a portion of the sulfur dioxide 305 into sulfuric acid by contacting the sulfur dioxide 305 with a metal oxide catalyst (such as the catalyst in the reactor 330).

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

The feature(s) of any one of the systems 100A, 200A, or 300A (of FIG. 1A, 2A, or 3A, respectively) can be combinable with feature(s) of any other of the systems 100A, 200A, or 300A. For example, one or more features of system 100A can be combined with one or more features of system 200A. As another example, one or more features of system 100A can be combined with one or more features of system 300A. As another example, one or more features of system 200A can be combined with one or more features of system 300A. As another example, one or more features of system 100A can be combined with one or more features of system 200A and also with one or more features of system 300A. Similarly, feature(s) of any one of the methods 100B, 200B, or 300B (of FIG. 1B, 2B, or 3B, respectively) can be combinable with feature(s) of any other of the methods 100B, 200B, or 300B.

Any one or more of the systems 100A, 200A, or 300A can be combined with any other of the systems 100A, 200A, or 300A. For example, a combined system can include system 100A and 200A, where a hydrogen sulfide feed stream is split and distributed to both systems 100A and 200A. As another example, a combined system can include systems 100A and 300A, where a hydrogen sulfide feed stream is split and distributed to both systems 100A and 300A. As another example, a combined system can include systems 200A and 300A, where a hydrogen sulfide feed stream is split and distributed to both systems 200A and 300A. As another example, a combined system can include systems 100A, 200A, and 300A, where a hydrogen sulfide feed stream is split and distributed to all systems 100A, 200A, and 300A. Similarly, any one or more of the methods 100B, 200B, or 300B can be combined with any other of the methods 100B, 200B, or 300B.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method comprising:
providing power to an electrochemical cell, the electrochemical cell comprising an anode side and a cathode side, wherein the electrochemical cell is operated at an operating temperature in a range of from about 25 degrees Celsius (C) to about 100° C.;
flowing hydrogen sulfide in a liquid state to the anode side, wherein providing power to the electrochemical cell facilitates electrolysis of the hydrogen sulfide to produce sulfur and protons on the anode side and reduction of protons to produce hydrogen on the cathode side;
after producing the sulfur, heating the electrochemical cell to liquefy the sulfur, such that the sulfur can flow out of the anode side;
preventing, by a membrane separating the anode side from the cathode side, flow of hydrogen sulfide and sulfur from passing through the membrane while allowing hydrogen cations to pass through the membrane;
flowing sulfur out of the anode side; and
flowing hydrogen out of the cathode side.

2. The method of claim 1, wherein the hydrogen cations produced on the anode side pass through the membrane to the cathode side, and providing power to the electrochemical cell facilitates reduction of the hydrogen cations that have passed through the membrane to produce hydrogen on the cathode side.

3. The method of claim 2, wherein the hydrogen sulfide flowed to the anode side has a space velocity in a range of from about 1,000 per hour to about 50,000 per hour through the anode side.

4. The method of claim 3, wherein the membrane separating the anode side from the cathode side has a thickness in a range of from about 1 micrometer to about 500 micrometers.

5. The method of claim 4, wherein the membrane separating the anode side from the cathode side comprises a polymer proton-exchange membrane that is an electrical insulator and configured to conduct protons.

6. The method of claim 5, wherein the power provided to the electrochemical cell has a voltage in a range of from about 1 volt (V) to about 3 V.

7. The method of claim 6, wherein the electrochemical cell is heated to a sulfur melting temperature of about 150° C. to liquefy the sulfur, such that the sulfur can flow out of the anode side.

8. The method of claim 7, wherein the anode side of the electrochemical cell is operated liquid full.

* * * * *